No. 783,474. PATENTED FEB. 28, 1905.
F. P. SMITH.
EVAPORATING EXCRETAL CLOSET.
APPLICATION FILED APR. 2, 1903.
FIG. 1.
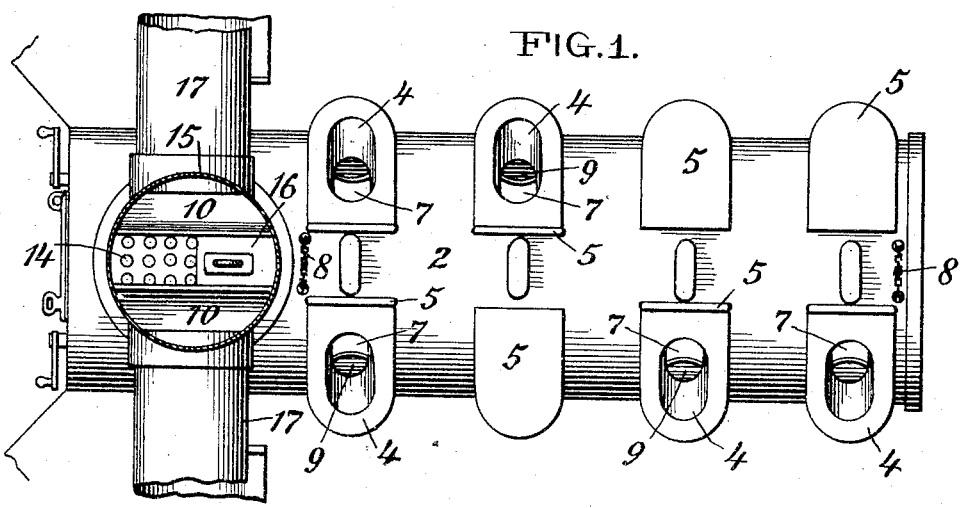
FIG. 2.
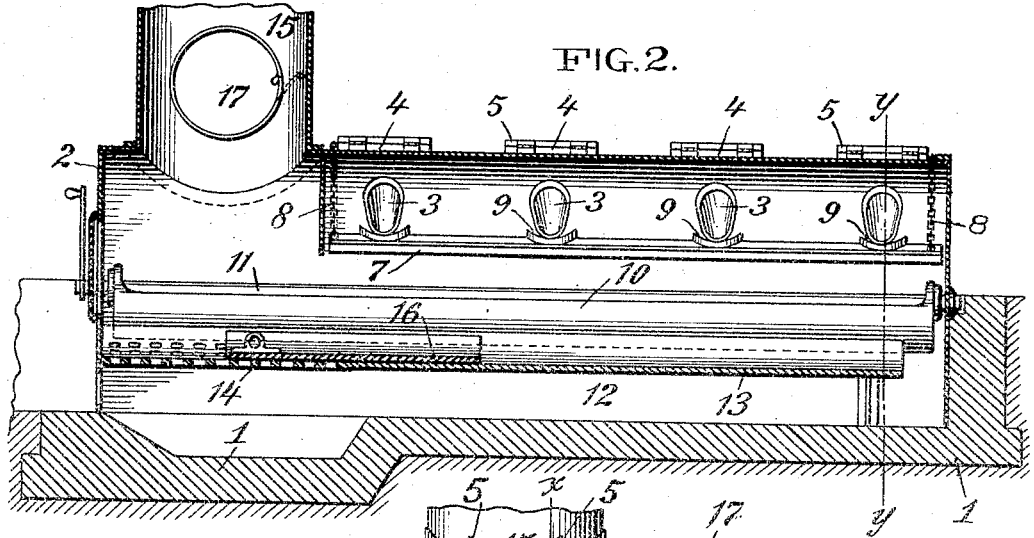
FIG. 3.
WITNESSES:
Donn Twitchell
John H. Duvall
INVENTOR
Fred P. Smith
BY
Benjamin Price
ATTORNEY No. 783,474.

Patented February 28, 1905.

UNITED STATES PATENT OFFICE.

FRED P. SMITH, OF NEW YORK, N. Y., ASSIGNOR TO THE MUNICIPAL ENGINEERING COMPANY, OF NEW YORK, N. Y., A CORPORATION OF DELAWARE.

EVAPORATING EXCRETAL CLOSET.

SPECIFICATION forming part of Letters Patent No. 783,474, dated February 28, 1905.

Application filed April 2, 1903. Serial No. 150,684.

*To all whom it may concern:*

Be it known that I, FRED P. SMITH, a citizen of the United States, and a resident of the city, county, and State of New York, have invented a new and useful Improvement in Evaporating Excretal Closets, of which the following is a full description.

My invention is intended to be used for the convenience of the public and travelers, and is constructed to burn or cremate solid and evaporate the liquid matter in order that no smell or other nuisance may be permitted to escape into the surrounding neighborhood. It is especially useful in camp-grounds or places of public exhibitions and disposes of camp wastes by desiccation by currents of dry air and to sterilize these wastes by heat and finally to cremate them without handling and without personal contact therewith.

The accompanying drawings illustrate the invention, of which—

Figure 1 is a top or plan view of the apparatus; Fig. 2, a longitudinal sectional view taken on line $x\ x$ of Fig. 3; Fig. 3, a vertical view, partly in section, taken on line $y\ y$ of Fig. 2.

Upon a foundation 1 1 I have placed a tank or receptacle 2 of suitable material and of any preferred form or shape to accommodate the devices for receiving the waste erected inside and the hoppers and seats on the outside thereof.

The receptacle is provided with an opening or openings 3. These openings are covered by seat-hoppers 4, provided with the hinged top or lid 5, as is usual in closets. The seats are punctured with small holes 6, and the holes are covered with gauze or light textile material, which allows air to be drawn through by the interior draft, but prevents the entrance of flies that might otherwise carry off the germs of disease. Within the receptacle I have erected the devices for receiving the solid and liquid matter and for evaporating, desiccating, and burning the same, and these devices are as follows: Immediately below the seat is placed a hinged catch-pan 7, the free end of which is suspended and held by a chain 8 or other equivalent device for the purpose, which is provided with means (not shown in the drawings) for releasing the catch-pan to allow it to drop and discharge any matter collected thereon. Such means are placed within reach of the occupant of the seat, as is usual in such devices. The catch-pan is located in position to receive and hold the solid matter falling through the opening and is perforated to allow such liquid matter as may fall thereon to pass through. Near the hinged end of the pan I have placed a larger opening 9 in line with the usual course of urine or liquid matter to allow this liquid to pass without falling on the catch-pan. Below the catch-pan is shown a trough or troughs 10, running under the seats and pan and located to receive the liquid matter dropping from or through the pan. This trough is swung upon a rod or bar 11 properly journaled, so that the trough is rotatable and may be turned as desired. Erected upon the bottom of the receptacle is a flue or channel 12, having a concave cover 13. The front end of this cover is provided with a grate 14 or is otherwise perforated. A fire may be built upon it, its heat escaping into the chimney 15. A sliding plate 16 is arranged to cover this grate and when closed a fire may be built in the flue 12. When the grate is thus covered by the plate, the heat from the fire below passes through the flue to the rear, around the end of its concave cover and above it, and is thence drawn by the chimney-draft through the receptacle, over the trough, and under the catch-pans, carrying off the noxious odors and burning them in passing to the chimney.

The urinals 17 are arranged to enter the side of the chimney and discharge into the troughs 10. The seats are always closed except when in actual use and so arranged as to be held up by the back of the occupant when seated. When released, they fall by gravity and remain closed.

It will be seen by the above arrangement that when the free end of the catch-pan is dropped the matter thereon will be discharged upon the concave cover of the flue 12 and be there desiccated and burned, and when they remain suspended they protect the occupant of the seat from discomfort by reason of the heat below. As the heat from the flue is drawn to the chimney it evaporates the liquid in the troughs and carries it off, and when the troughs are rotated any remaining solid matter adhering thereto will be burned by contact with the flame. Air for evaporation is drawn into the receptacle through the holes 6 in the seat.

A general purification of the entire device may be had by turning over the troughs, dropping down the catch-pans, and building a good hot fire in the flue, allowing the heat to permeate all parts of the interior of the receptacle and burn out all the deleterious matter therein and destroy the germs of disease. The device is equally well adapted to work upon garbage or matter of like character which may be thrown into any of the seat-hoppers. A floor may be arranged at a suitable level to accommodate the users of the closet.

What I claim, and desire to secure by Letters Patent, is—

1. In an evaporating-closet a closed receptacle provided with openings and a seat hopper or hoppers arranged over said openings, in combination with a hinged catch-pan located in the receptacle below the openings adapted to retain the solid matter and allow the liquid to escape, a receptacle below the catch-pan to receive the escaping liquid, a heating-floor to receive the solid matter from the pan, means for inducing heat upon the heating-floor to desiccate the solid matter and evaporate the liquid, and a chimney to carry off the heat and vapors from the receptacle.

2. In an evaporating-closet a closed receptacle, provided with openings and means for closing said openings, in combination with a hinged catch-pan within the receptacle and located below the openings adapted to retain the solid matter and allow the liquid matter to escape, a pivoted trough below the pan to catch and retain the liquid, a heating-floor to receive the solid matter from the pan, means for heating the floor and a chimney to draw the heat under the floor, over the trough and through the receptacle.

In testimony whereof I, the said FRED P. SMITH, have signed my name to this specification, in the presence of two subscribing witnesses, this 26th day of March, 1903.

FRED P. SMITH.

Witnesses:
M. TURNER,
JOHN H. DUVALL.